United States Patent
Baldwin

(10) Patent No.: US 9,593,866 B2
(45) Date of Patent: Mar. 14, 2017

(54) THERMAL HEAT STORAGE SYSTEM

(71) Applicant: SunLight Power, Inc., Solana Beach, CA (US)

(72) Inventor: David Baldwin, Solana Beach, CA (US)

(73) Assignee: Sunlight Power, Inc., Solana Beach, CA (US)

( * ) Notice: Subject to any disclaimer, the term of this patent is extended or adjusted under 35 U.S.C. 154(b) by 0 days.

(21) Appl. No.: 13/781,690

(22) Filed: Feb. 28, 2013

(65) Prior Publication Data

US 2013/0333691 A1 Dec. 19, 2013

Related U.S. Application Data

(60) Provisional application No. 61/659,953, filed on Jun. 14, 2012.

(51) Int. Cl.
| | | |
|---|---|---|
| F28D 17/00 | (2006.01) | |
| F24J 2/34 | (2006.01) | |
| F28D 20/02 | (2006.01) | |
| F03G 6/06 | (2006.01) | |
| F24J 2/07 | (2006.01) | |

(52) U.S. Cl.
CPC ........ *F24J 2/34* (2013.01); *F03D 9/10* (2016.05); *F03G 6/064* (2013.01); *F24J 2/07* (2013.01); *F28D 17/00* (2013.01); *F28D 20/02* (2013.01); *F28D 20/021* (2013.01); *Y02E 10/41* (2013.01); *Y02E 10/46* (2013.01); *Y02E 10/72* (2013.01); *Y02E 60/145* (2013.01)

(58) Field of Classification Search
CPC ........ F28D 20/02; Y02E 10/46; Y02E 60/145
USPC ............................................ 165/1, 10
See application file for complete search history.

(56) References Cited

U.S. PATENT DOCUMENTS

| | | | | |
|---|---|---|---|---|
| 2,078,947 A | * | 5/1937 | Lassiat | A01B 33/02 422/200 |
| 3,722,445 A | * | 3/1973 | Karig | F42B 19/20 114/337 |
| 3,901,036 A | * | 8/1975 | Martin | F03G 6/00 126/638 |
| 4,037,579 A | | 7/1977 | Chubb | |

(Continued)

FOREIGN PATENT DOCUMENTS

| | | |
|---|---|---|
| WO | 0079202 A1 | 12/2000 |
| WO | 2010/083285 | 7/2010 |

(Continued)

OTHER PUBLICATIONS

"Crescent Dunes Solar Energy Project Fact Sheet", Solar Reserve, Tonopah Solar Energy, LLC, Sep. 2010, pp. 1-5.

(Continued)

*Primary Examiner* — Audrey K Bradley
*Assistant Examiner* — Shafiq Mian
(74) *Attorney, Agent, or Firm* — Meunier Carlin & Curfman LLC

(57) ABSTRACT

A thermal heat storage system is provided, including a storage tank, a heat injection system and a heat recovery system. The storage tank holds a material for thermal storage. The heat injection system is coupled to an intake on the storage tank. The heat recovery system is coupled to an output on the storage tank and also uses vapor under depressurized conditions for heat transfer.

17 Claims, 7 Drawing Sheets

(56) References Cited

U.S. PATENT DOCUMENTS

| | | | | |
|---|---|---|---|---|
| 4,088,183 A | * | 5/1978 | Anzai | F28D 20/021 126/400 |
| 4,124,061 A | * | 11/1978 | Mitchell | F24J 2/42 126/400 |
| 4,153,047 A | * | 5/1979 | Dumbeck | F28D 20/0056 126/400 |
| 4,192,144 A | * | 3/1980 | Pierce | 60/641.8 |
| 4,200,148 A | | 4/1980 | Friefeld et al. | |
| 4,295,519 A | * | 10/1981 | Bellaff | F28G 1/00 165/11.1 |
| 4,330,307 A | * | 5/1982 | Coury | B01D 5/0012 62/618 |
| 4,466,478 A | * | 8/1984 | Carlsson | C09K 5/063 165/10 |
| 4,545,217 A | * | 10/1985 | Nakao | B01D 1/10 62/476 |
| 4,696,338 A | | 9/1987 | Jensen et al. | |
| 4,807,696 A | * | 2/1989 | Colvin | F28D 20/023 126/400 |
| 5,082,582 A | * | 1/1992 | Ames | C09K 5/02 165/10 |
| 5,135,825 A | | 8/1992 | Mori et al. | |
| 5,484,576 A | * | 1/1996 | Langer | B01J 8/0207 422/198 |
| 5,685,151 A | * | 11/1997 | Ross | F03G 6/067 60/641.15 |
| 5,685,289 A | * | 11/1997 | Yogev | F24J 2/34 126/400 |
| 5,687,706 A | * | 11/1997 | Goswami | F24H 7/0433 126/263.01 |
| 6,530,369 B1 | | 3/2003 | Yogev et al. | |
| 8,138,629 B2 | | 3/2012 | Marks De Chabris | |
| 8,224,495 B2 | * | 7/2012 | Weaver | F01K 3/16 137/828 |
| 2001/0028791 A1 | * | 10/2001 | Salyer | F24H 7/0433 392/341 |
| 2009/0121495 A1 | * | 5/2009 | Mills | 290/4 D |
| 2009/0178409 A1 | * | 7/2009 | Shinnar | F01K 3/00 60/645 |
| 2009/0250189 A1 | * | 10/2009 | Soukhojak et al. | 165/10 |
| 2010/0212656 A1 | * | 8/2010 | Qiu et al. | 126/618 |
| 2011/0067690 A1 | | 3/2011 | Slocum et al. | |
| 2011/0083436 A1 | * | 4/2011 | White et al. | 60/670 |
| 2011/0083827 A1 | * | 4/2011 | Salyer | F24F 5/0021 165/104.14 |
| 2011/0120673 A1 | * | 5/2011 | Xiang | C09K 5/063 165/104.25 |
| 2011/0226780 A1 | * | 9/2011 | Bell | F28D 20/0034 220/565 |
| 2011/0314812 A1 | * | 12/2011 | Sonwane | F28D 20/0034 60/641.8 |
| 2012/0037148 A1 | * | 2/2012 | Tudor | F28D 20/02 126/400 |
| 2012/0067551 A1 | * | 3/2012 | Ganapathi | F28D 20/021 165/104.21 |
| 2012/0319410 A1 | * | 12/2012 | Ambrosek et al. | 290/1 R |

FOREIGN PATENT DOCUMENTS

| | | | |
|---|---|---|---|
| WO | WO 2010/083285 | 7/2010 | |
| WO | WO 2012037532 A2 | * 3/2012 | 60/641.15 |

OTHER PUBLICATIONS

"How It Works", Bright Source Technology, accessed on Jun. 4, 2012, www.brightsourceenergy.com/how-it-works.

Adinberg et al, High temperature thermal energy storage an experimental study, J. Phys. IV France, Mar. 1999, vol. 9 No. PR3, Proceedings of the 9th SolarPACES International Symposium on Solar Thermal Concentrating Technologies, pp. 89-94.

Supplementary European Search Report dated Jun. 29, 2016, which issued during prosecution of European Application No. 13 80 4190.

* cited by examiner

THERMAL HEAT STORAGE SYSTEM

CROSS REFERENCE TO RELATED APPLICATIONS

This application claims priority benefit to U.S. Provisional Application No. 61/659,953, entitled "Thermal Heat Storage System" filed Jun. 14, 2012, which is incorporated by reference in its entirety herein as if it was put forth in full below.

BACKGROUND

Providing power continuously from a renewable primary energy source requires energy storage. Ideally, the storage should supply the same power level as the primary source, as well as be available on demand in a dispatchable manner. Many energy storage technologies are known in the industry such as battery, rotating-machinery, pumped-hydro, compressed air, hydrogen production and storage fluids, such as molten salt.

The molten-salt storage system designs usually have a double storage tank layout, a "hot tank" for salt recently heated and a "cold tank" for salt awaiting heating. The temperatures of the two tanks typically differ by 100° C. or more for acceptable stored energy density and heat exchanger efficiency. It is known in the art, for example, that thermal heat storage systems employing transport fluids at high temperatures can achieve hot-tank temperatures up to 500-600° C. or more. Accomplishing this using a transfer fluid, however, entails the use of pipes, pumps, etc., that can increase operational complexity. The molten-salt storage fluid is, itself, commonly used as the transfer fluid pumped between the primary power source, the storage tanks and the heat exchanger for electrical generation equipment. As well as the operational complexity, there is a risk of the salt freezing in the transfer pipes connecting the various components that imply heat wrapping, nighttime draining, or the like.

Solar and wind energy are included among renewable energy sources. Solar energy plants using solar radiation concentrating systems in conjunction with thermal heat storage devices is known in the art. The use of other liquid transfer fluids such as water, fluoride salt and other metal containing materials in thermal heat storage devices is also known in the art.

SUMMARY

A thermal heat storage system is provided, including a storage tank, a heat injection system and a heat recovery system. The storage tank holds a material for thermal storage. The heat injection system is coupled to an intake on the storage tank. The heat recovery system is coupled to an output on the storage tank and also uses vapor under depressurized conditions for heat transfer.

The present invention is better understood upon consideration of the detailed description below in conjunction with the accompanying drawings and claims.

DETAILED DESCRIPTION

The present invention uses vapor transport under evacuated or low pressure conditions, similar to the principle of the heat pipe, that is applied to both the power input and power extraction subsystems. Disclosed herein is a thermal heat storage system, including a storage tank, a heat injection system and a heat recovery system. The storage tank holds a material for thermal storage. The heat injection system is coupled to an intake on the storage tank. The heat recovery system is coupled to an output on the storage tank and also uses vapor under depressurized conditions for heat transfer.

As an example implementation, the storage tank has a temperature within that is maintained at about 800° C.; however, that temperature value may differ with a different storage or vapor transport material. The overall temperature deviation arising as a result of the thermal heat storage system is less than 80° C. In another embodiment, with different material selection and heat-exchange design, the overall temperature deviation of the thermal heat storage system is less than 50° C.

In one embodiment, the storage tank contains NaCl salt. The salt includes portions of both molten and solid salt which are separated naturally without pumping. The input system is coupled to an inlet of the heat injection system and provides (i) heat or energy from solar power, (ii) energy from wind power or (iii) heat or energy from another energy source, such as another renewable energy source or a non-renewable energy source.

Compressed air of a Brayton-cycle turbine-generator subsystem is heated using an external source. Exhaust air stream is rejected to the atmosphere with a temperature in the range of 175-225° C. and the exhaust air stream emissions produced are not environmentally detrimental.

In one embodiment, the heat injection system uses vapor under de-pressurized conditions for heat transfer. The heat injection system is comprised of a receiver, a down-tube and a subfloor. For the heat recovery system, heat transfer vapor is created via boiling Na floating on a salt under de-pressurized conditions.

The thermal heat storage provides dispatchable, 24-hour capability for providing electrical power and the power conversion system, or Brayton cycle turbine, reduces or eliminates the need for water-cooling. In one embodiment, when energy from wind power is used, the thermal heat storage eliminates the need for power conditioning equipment that is typically required for this type of intermittent renewable energy power generation source.

Figure 1:
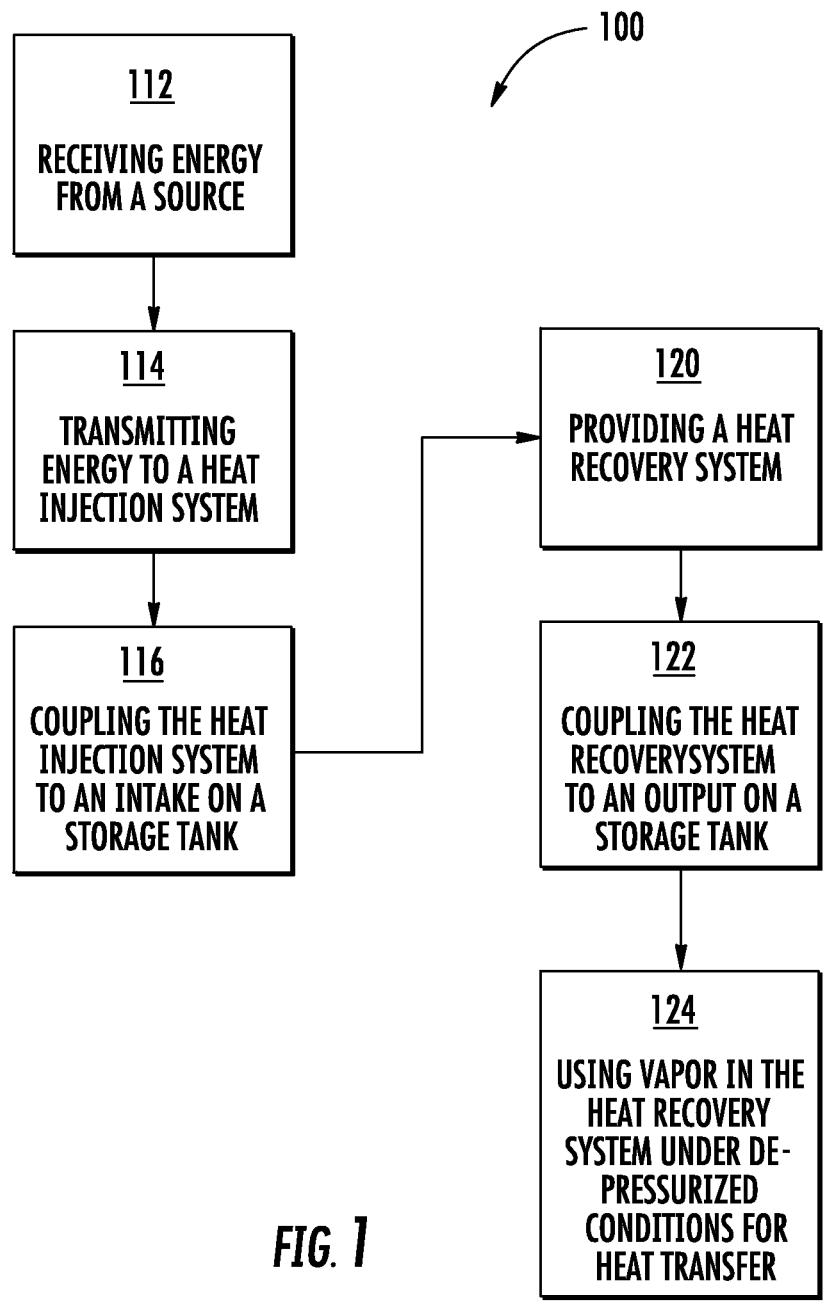
FIG. 1 is a flowchart for a method for heat transfer.

FIG. 1 is a flowchart for a method for heat transfer 100 that draws repeatedly on well-known properties of material phase change. The method starts at step 112 by receiving energy from a source. This source may be a renewable energy source such as solar or wind or the like, or a non-renewable energy source. The energy is transmitted to a heat injection system at step 114. At step 116, the heat injection system is coupled to an intake on a storage tank. In one embodiment, the primary source is solar or another high temperature energy source, and the receiver energy is used to vaporize a volatile fluid under depressurized conditions with heat transport arising from the vapor's subsequent condensation in the somewhat cooler storage tank. At step 120, a heat recovery system is provided and at step 122, coupled to an output on the storage tank. Energy stored in the storage tank is extracted when required using a technique that prevents icing of the heat-removal surface, and the extracted heat is then used to provide high temperature heat for electric power generation. At step 124, vapor in the heat recovery system under de-pressurized conditions is used for heat transfer. The extraction technique, or heat recovery system, entails depressurized boiling of a volatile fluid from the surface of the salt, with no solid accumulation at the surface, as the heavier solid sinks to the tank bottom, and then condensing the resulting vapor in a heat exchanger.

Figure 2:
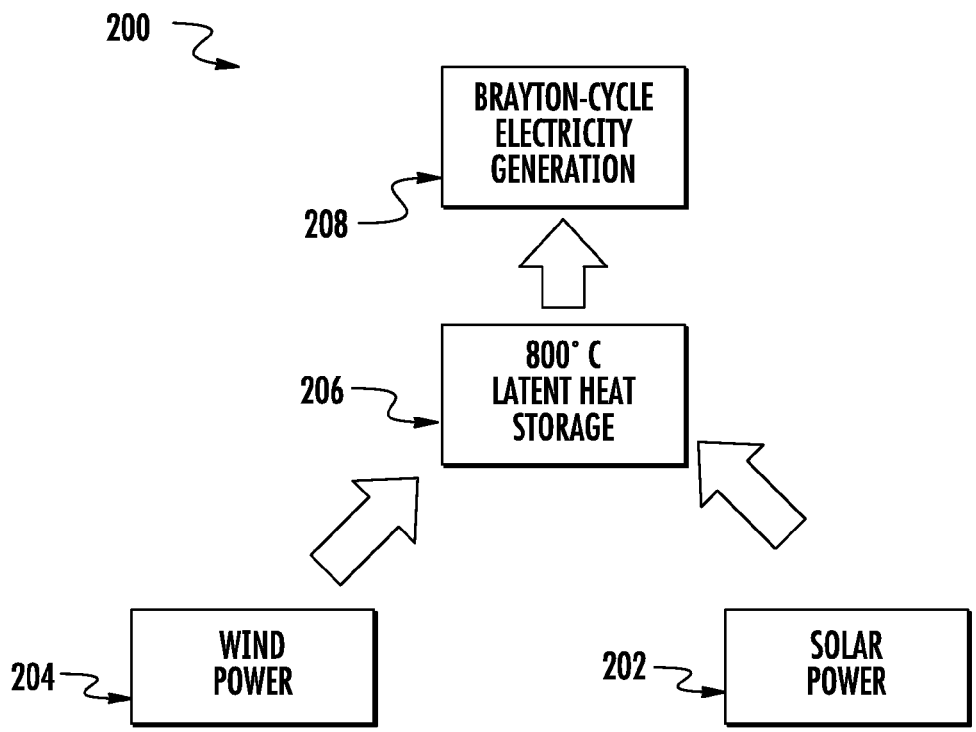
FIG. 2 illustrates an overall energy flowchart for embodiments of the thermal heat storage system.

In another embodiment, wind is the primary energy source, and wind-generated electric power can be used directly to heat the salt in the storage tank with resistant heating electrodes, with subsequent extraction using the same steps as 120, 122 and 124. In this embodiment, the wind-generated electric power is part of the heat injection system, which is coupled to an intake on a storage tank FIG. 2 illustrates an overall energy flowchart for two embodiments of the thermal heat storage system. In both embodiments, the thermal heat storage system 200 takes power from a renewable energy source such as solar technology 202 or wind technology 204, transfers it through a latent heat storage device 206 and then, on demand, to a Brayton-cycle gas-turbine 208 or other high-efficiency generator of electricity. Brayton-cycle gas-turbine 208 has inherent efficiency and little or no cooling fluid requirement. Thermal heat storage system 200 enables dispatchable, 24-hour capability for providing electrical power or thermal energy for other purposes.

The design uses vapor evaporation-condensation under evacuated conditions to achieve high heat transfer rates through flows generated by small, naturally occurring pressure differences. Evaporation of a volatile material, e.g., a sodium (Na) surface when using NaCl as the salt within the storage tank, enables heat extraction from a liquid-liquid interface that does not support adherence of solid material. A dense solid of salt forms and sinks, so that reheat is localized at the bottom of the storage tank. A different volatile fluid may be used with salts other than NaCl, for example, potassium chloride KCl. The power input and the power extraction occur in separate, evacuated subsystems, where the heat injection system and the heat recovery system, respectively, each having a hot zone, where a working fluid, for example, Na is vaporized, and a cooler zone, where the vapor condenses. The vaporization-condensation process constitutes an efficient heat transport mechanism when functioning in an evacuated environment without the inhibiting effects of a non-condensing gas, like air.

Provided a volume has been sufficiently depressurized, the Na vapor temperature and pressure will be essentially constant throughout the volume, with the temperature value set by the molten salt. The resultant power transfer will be determined by the conduction properties of the walls of a storage tank of the hot and cold zones. The temperature difference across each zone wall will be that necessary to conduct the system's power flow through that wall; as a consequence, the total temperature drop occurs only in the zone endwalls. Therefore, those walls should be made thin thus having high thermal conductivity. Negligibly small pressure differences between the hot and cold zones are sufficient to convect the Na vapor. The power flux can be extremely high, approximately the vapor energy density (as represented by the Na heat-of-vaporization) times a fraction of the limiting sound speed. For example, at 5% of the local sound speed, the Na vapor at 800° C. has a power flux of 28 MW/m$^2$.

For heat extraction, when the hot zone is located below the cold zone, return of the condensed working fluid to the hot zone occurs naturally by gravity-forced flow. When the hot zone is above the cold zone, condensed working fluid is returned using mechanical pumping. For the input process illustrated in FIG. 4 and discussed below, where the hot zone may be considerably above the cold zone, the molten Na is returned by auxiliary pump. In any event, the quantities of pumped Na are small, for example, about 0.3 liters/MJ of transferred energy; and there is little risk of Na solidification, as the freezing point of Na is approximately 100° C.

One aspect of this type of thermal heat storage system is that its temperature enables relatively high-efficiency electricity generation, for example, a Brayton-cycle gas turbine generator. Furthermore, the resulting heated air stream from the thermal heat storage system to the turbine has substantially constant temperature. In adopting a Brayton-cycle turbine to this system, the usual combustion chamber is replaced by the diversion of the air stream through the heat exchanger mounted on the storage tank, enabling heating of the compressed air by an external source to a temperature of nearly 800° C. In further embodiments, incorporating other generation technologies with other storage materials, different melt temperatures may be used. In this embodiment, the overall temperature deviation arising as a result of the thermal heat storage system is less than 80° C. In another embodiment, with different material selection and heat-exchange design, the overall temperature deviation of the thermal heat storage system is less than 50° C.

A Brayton-cycle gas turbine, currently available on the market, may be used in the thermal heat storage system. The Brayton-cycle gas turbine needs to be capable of external heating wherein the normal compression chamber is replaced by a heat exchanger connected to the storage tank output. For purposes of the present invention, the Brayton-cycle gas turbine is designed to operate in an open, once-through mode. An exhaust air stream is ultimately rejected to the atmosphere with a temperature in the range of 175-225° C. after much of its energy has been recovered. The exhaust air stream emissions produced are not environmentally detrimental which may be desirable for environmental considerations. The thermal energy from the exhaust air stream emissions produced may be used in conjunction with ancillary systems such as desalination or absorption chilling.

Figure 3:
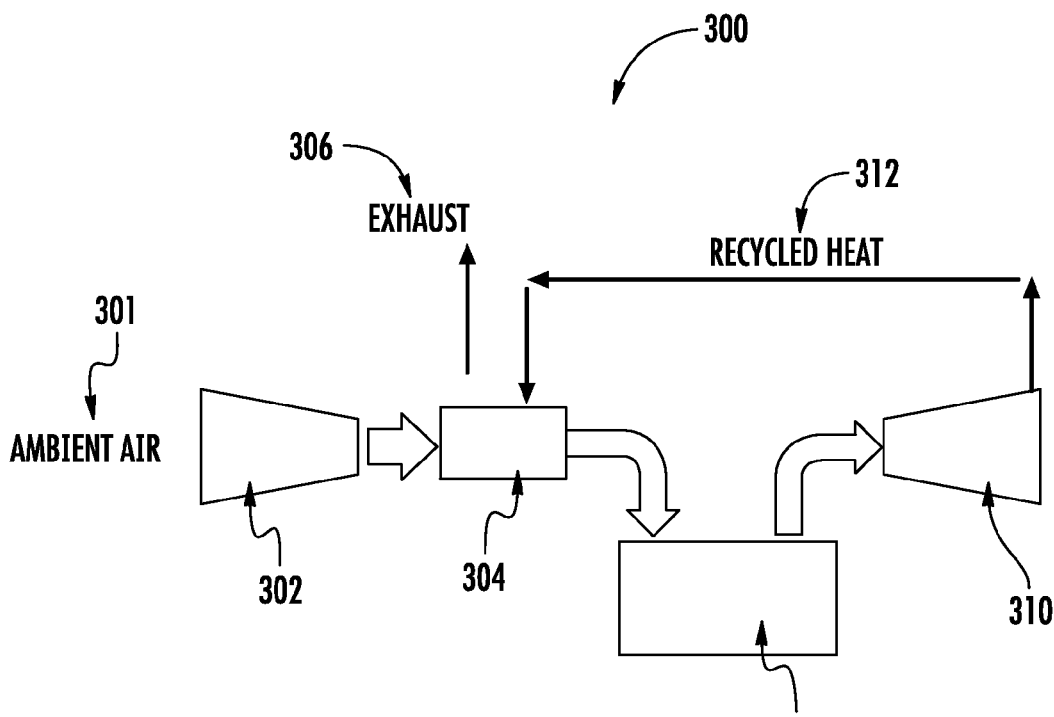
FIG. 3 depicts an example of a Brayton-turbine subsystem of the present invention.

FIG. 3 depicts a Brayton-turbine subsystem 300 summarizing a self-consistent simulation of the turbine performance. Ambient air 301 enters into a compressor 302 where it is compressed to approximately 10 atmospheres. In order to reduce compressive work, the compression is carried out in two stages with intercooling between. The heat removed is included in the final calculated efficiency but requires cooling that can be achieved by a number of means such as water, air or the adaptation/utilization of other beneficial processes including absorption chillers, desalination processes, or the like. The air stream emerges from compressor 302 at a temperature of about 180° C. and enters a recuperator 304 where it is heated by exhaust heat recycled from turbine exhaust 312. The air stream then passes to a heat exchanger 308 which is mounted on the storage tank, where it is heated to nearly 800° C., emerging at about 770° C. The compressed and heated air stream then enters a turbine-generator 310 for electricity generation. The exhaust stream from the turbine, which is then near atmospheric pressure and at about 407° C., is recycled to recuperator 304 where a portion of the exhaust energy is partially captured. The final exhaust temperature in this model is approximately 200° C., with about 5.0 MW(e) of power generated. The efficiency for this process is approximately 43.5%. With the intake of ambient air and exhaust after recuperation, the need for cooling water has been greatly reduced or eliminated. Also, a typical combustion chamber is eliminated because the compressed air is heated in the heat exchanger.

Figure 4:
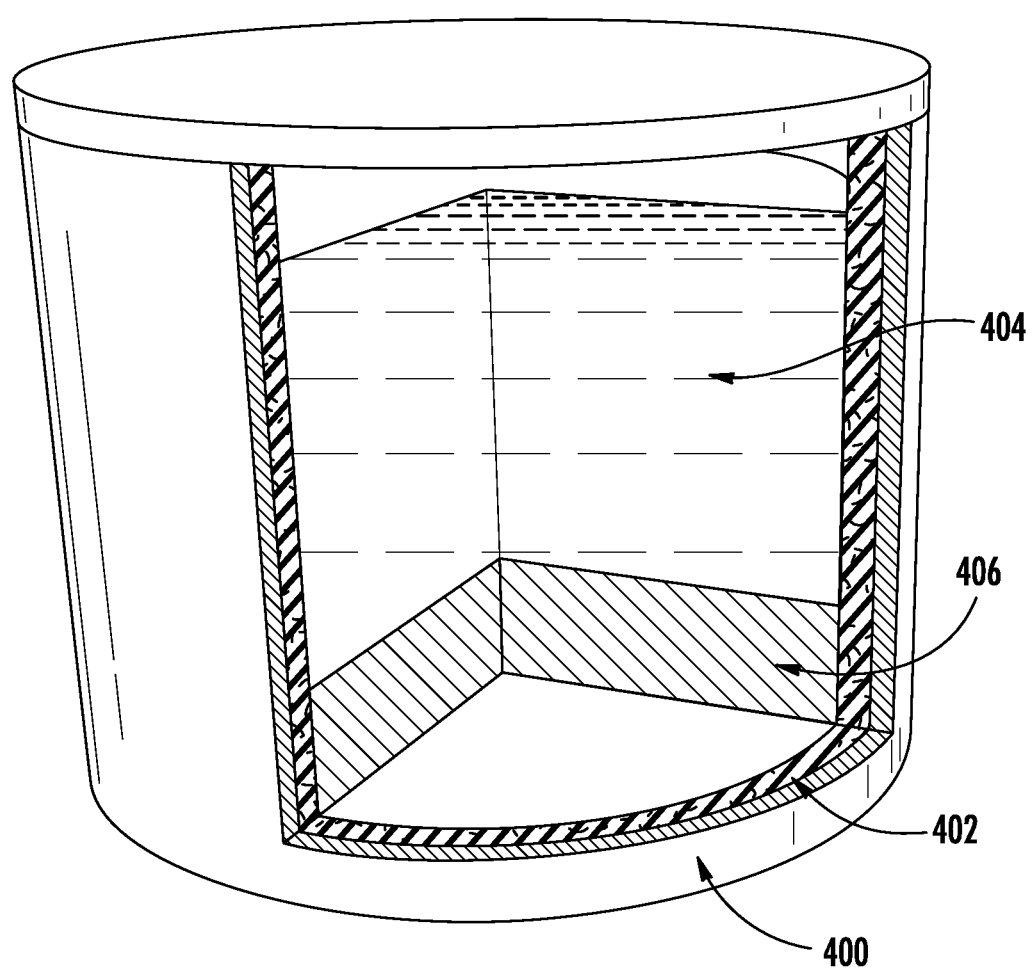
FIG. 4 depicts one embodiment of a heat storage tank of the present invention.

The thermal heat storage system comprises a single storage tank. An example of one embodiment of a heat storage tank of the present invention is depicted in FIG. 4. In this example, a storage tank 400 is made of steel with an insulation layer 402 and may be placed below or above grade. Storage tank 400 may be made of other materials, for example, ceramic brick reinforced with steel. The insulation layer 402 should be sufficient to restrict heat loss to a few percentages per day. In this embodiment, storage tank 400 holds a material for thermal storage. The working fluid in the storage tank is NaCl salt and illustrated as liquid NaCl 404 lying above solid NaCl 406, the heavily solid having sunk to the tank bottom. Storage tank 400 has a temperature within that is maintained at about 800° C., with varying fractions of liquid and solid as heat is added and removed. The system's operating design temperature of 800° C. enables efficient Brayton cycle electricity generation. NaCl salt has a high latent heat of 482 kJ/kg. For example, with latent heat storage in NaCl, 1000 m$^3$ of the salt has a capacity of approximately 120 MW$_t$-h, assuming 50-70% of the salt is melted/frozen through the cycle. NaCl is readily available and has a low material cost. In other embodiments, other working fluids or volumes may be used.

The salt in storage tank 400 includes portions of both molten and solid salt which are separated naturally without pumping. Molten sodium (Na) floating on the upper surface of molten salt can extract heat from the salt without having a material surface for the adhesion of the solid salt thus formed. Because the frozen salt density is greater than that of the molten salt, the frozen form sinks, thereby keeping the interface clear. The melt temperature of NaCl is 801° C., the fluid NaCl density at this temperature is approximately 1500 kg/m$^3$; the solid NaCl density is approximately 2000 kg/m$^3$; and the density of Na is 780 kg/m$^3$. Thus, in molten NaCl, solid salt sinks and Na floats. Moreover, the mole-solubility of Na in NaCl is about 4%, thus it remains separated.

Under evacuated conditions, the Na layer will boil to the vapor of Na at 800° C., about 0.4 atm. The vapor thus created condenses on the cooler surfaces of the heat exchanger, causing an efficient transfer of heat. This heat-removal solidifies/freezes salt particles that sink to the bottom owing to their higher density. Tank reheat is, therefore, to be localized at the tank bottom. By exploiting the mass difference of molten and solid NaCl, the separation of the energized and de-energized components of the thermal heat storage system is achieved in a natural way with no need for pumping molten salt.

Figure 5:
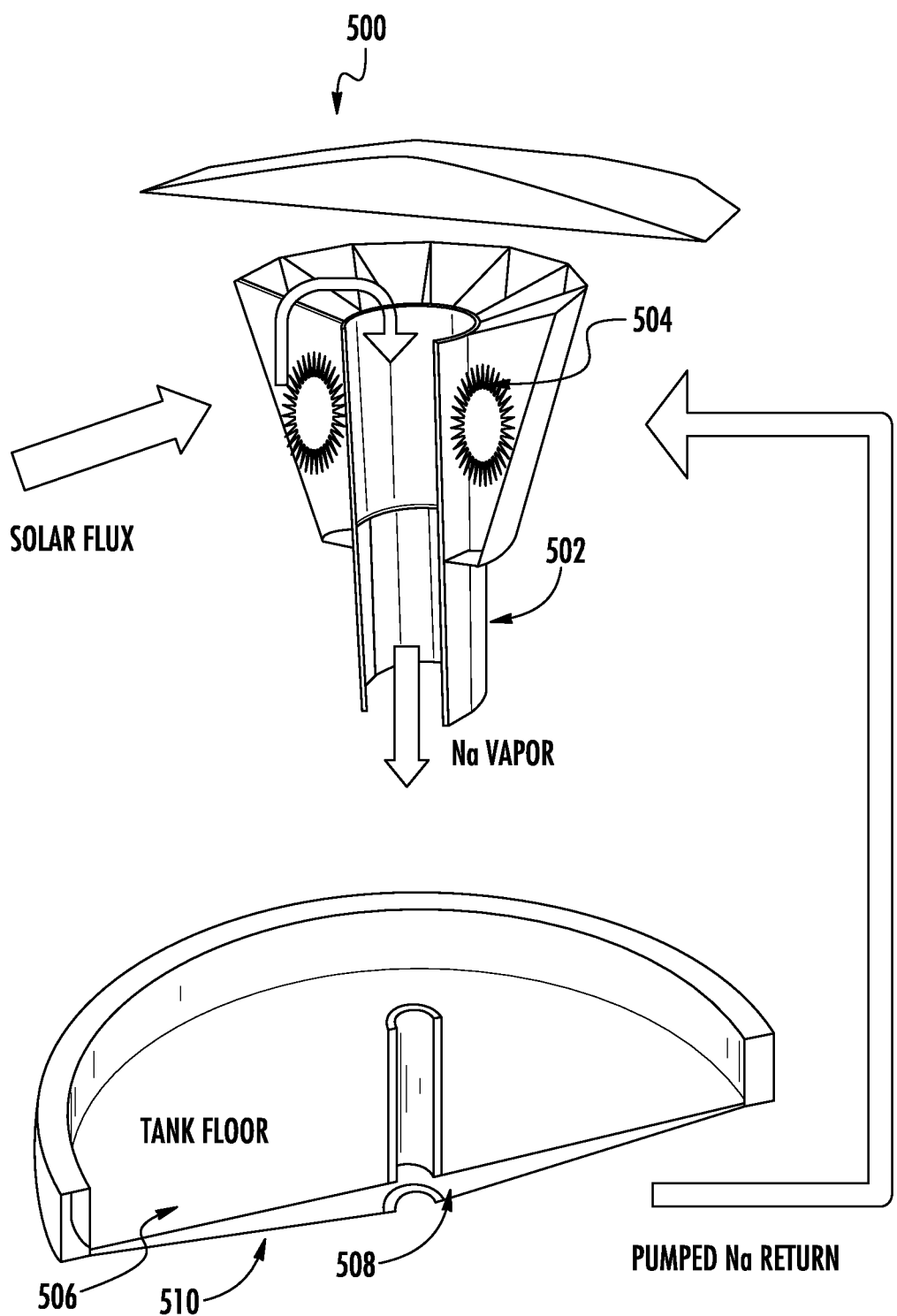
FIG. 5 shows an example of a thermal energy injection subsystem of the thermal heat storage system.

An example of an injection subsystem of the thermal heat storage system is shown in FIG. 5. A heat injection system 500 uses vapor under de-pressurized conditions for heat transfer and is comprised of a receiver, a down-tube and a subfloor. Heat is transferred via a down-tube 502 from a receiver 504 (described below) to the storage tank subfloor 506 using Na vapor formed in the receiver. The combined receiver, down-tube and subfloor form the injection subsystem that is depressurized. The rapid generation of vapor in the receiver creates increasing vapor pressure, naturally forcing flow down the down-tube to a chamber 508 below subfloor 506. Chamber 508 is the area between a storage tank floor 510 and subfloor 506. There, with vapor condensing due to contact with the somewhat cooler subfloor 506, flow is maintained by a slight pressure decrease. The small quantity of Na condensate is returned to the receiver by pump. Owing to the near constancy of the temperature, the receiver output temperature need be maintained only slightly above that required by subsequent electricity generation equipment. In other embodiments, chamber 508 can be replaced by a network of piping on storage tank floor 510 that is open to the Na vapor down-tube.

Na condensing in 508 is pumped back to the receiver. Because the heat-of-vaporization of Na is 4.25 MJ/kg and the density is about 0.8 kg/l, transferring 12 MW(t), e.g., requires pumping about 3-4 liters/sec. In steady state, the top-to-bottom pressure difference is small, meaning sufficient to overcome the viscous drag on the flow. Heat is transported internally by the small pressure differences arising naturally from the heating/vapor generation. As a consequence, the majority (if not all) losses are those due to conduction to the exterior that may be minimized in the design.

The vapor temperature depends on the power transferred and the relative properties of the material surfaces through which it must pass. For example, introducing the floor parameter k/d, where k is floor material thermal conductivity in W/m$^2$-° K. K and d is the floor thickness in m, the difference in temperature between the vapor and the salt is power/(area×(k/d)). The k/d ratio may be 2000 for a floor substantial enough to support the weight of the salt, in which case the temperature rise for a 12 MW power flow through a 100 m$^2$ floor would be 60° K. This may be made smaller with a greater heat-transfer area, e.g., using piping, or higher k/d value.

In the receiver, the same value of k/d would be lower than desirable, as the 8-times smaller area would result in an increase in the outer-surface temperature, where radiation should be minimized. The receiver shell is not load bearing, however, as is the tank floor; so it may be made much thinner, with the goal of 10,000 for the k/d ratio.

Figure 6:
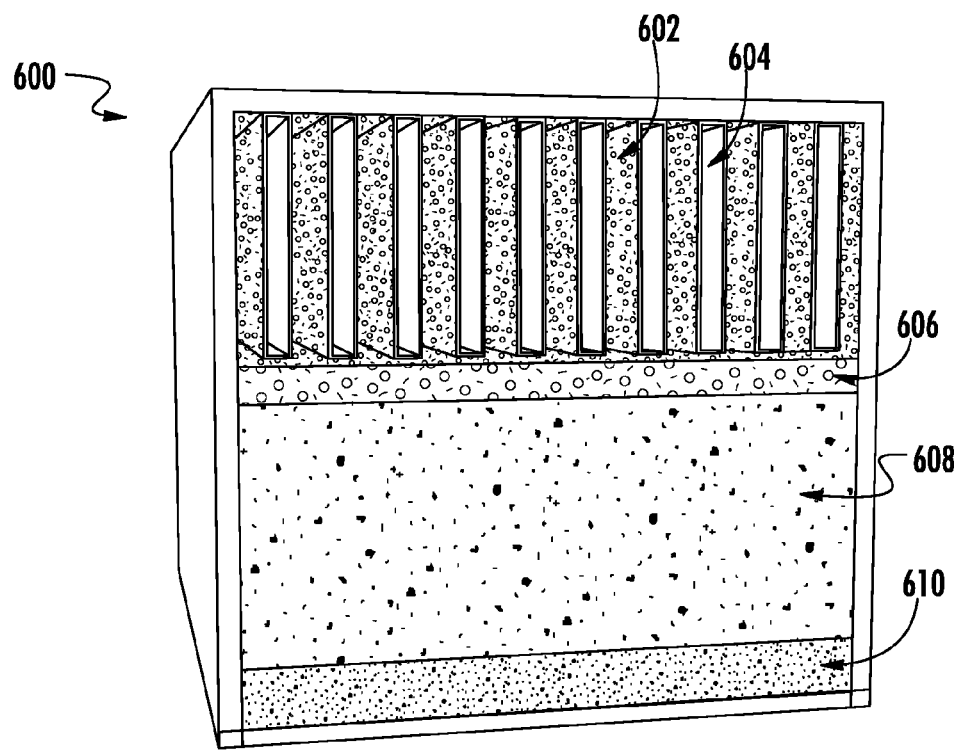
FIG. 6 illustrates a heat exchanger mounted at the top of a storage tank of the present invention.

A heat exchanger mounted at the top of a storage tank is illustrated in FIG. 6. Heat is extracted from the storage tank in a manner similar to the injection technique. In one embodiment, a cross-flow heat exchanger (HX) 600 is installed in the top of the storage tank and carries compressed air from an external Brayton turbine while enabling sufficient heating with a low drop in pressure. Condensation of the Na vapor 602 in the ducts 604, which are open to the Na vapor beneath, will heat the flowing air, thereby extracting latent heat from the tank. The condensed Na drips back to the surface of the salt. The heat recovery system for heat extraction is coupled to an output on the storage tank and uses heat transfer vapor created via boiling under de-pressurized conditions of the Na 606 floating on the molten salt 608 in a manner similar to the injection technique.

Power transfer via the Na vapor is potentially very high; however, power take-up by laminar flowing air is sufficiently weak as to require that the flow be turbulent. The vaporization freezes small particles of the salt 610 that sink to the bottom of the storage tank owing to their greater density. This extraction technique thereby eliminates or greatly mitigates the issue of icing.

The configuration for heat exchange from the vapor to the compressed air stream driving the Brayton turbine can take several forms, whose selection depends on several factors. All configurations have several features in common. The top of the storage tank, together with the heat exchanger, forms an isolated region and can be separately depressurized; a Na layer floating on the salt surface will boil until the pressure reaches the vapor pressure of Na at 800° C. at about 0.4 atm.; sodium vapor created at the salt surface condenses on pipes or ducts containing the pressurized air. Other heat exchanger configurations, above, below or beside the tank, but based on the same principles would represent differing embodiments of those principles.

Figure 7:
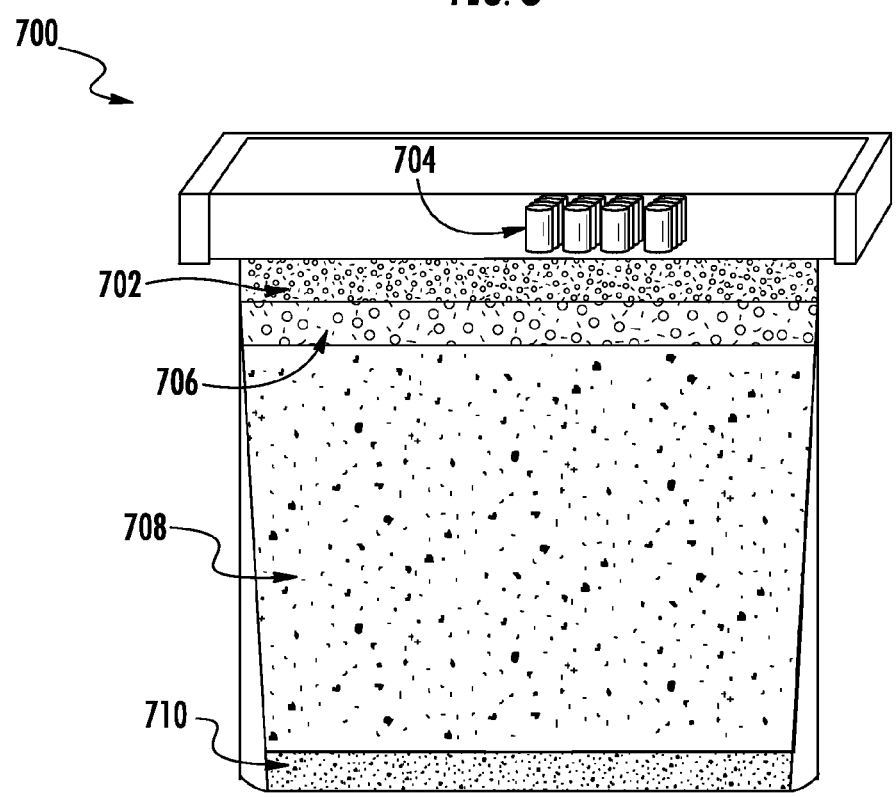
FIG. 7 shows another embodiment of the heat exchanger mounted at the top of a storage tank of the present invention.

For example, FIG. 7 is another embodiment of a heat exchanger mounted at the top of the storage tank. This cross-flow configuration 700 contains pipes 704 open to the Na vapor, which have height approximately 0.5 m high, diameter about 0.15 m and a separation about 0.25-0.3 m. Condensed Na 702 drips back to the salt surface 706. Molten salt 708 and frozen salt 710 are also detailed in FIG. 7.

Figure 8:
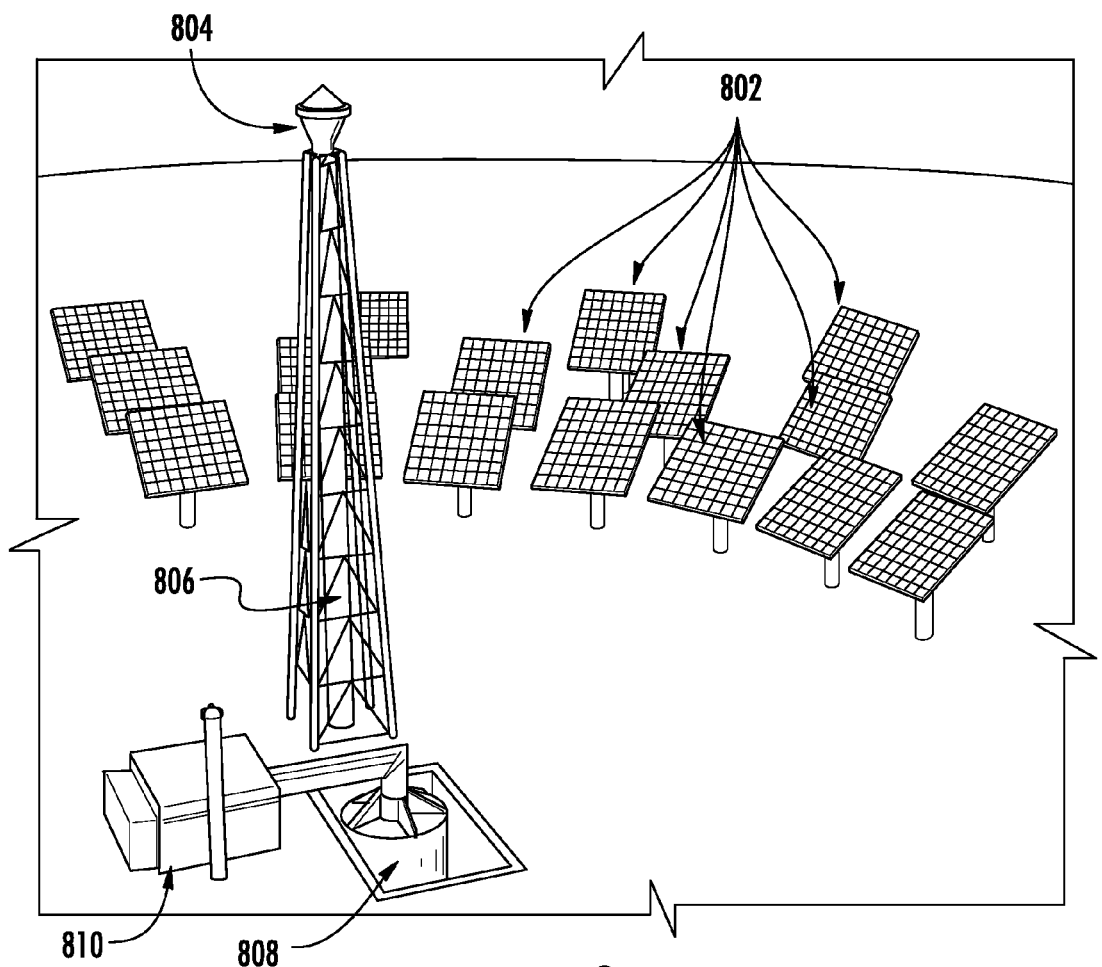
FIG. 8 depicts one embodiment of the thermal heat storage system using solar power.

The heat-transfer principles of power injection into the storage tank apply to any source at high temperatures, and for example, renewable energy sources. In one embodiment, the input system is coupled to an inlet of the heat injection system providing heat from solar power. FIG. 8 depicts a thermal heat storage system using solar power. Concentrated Solar Power (CSP) collects light from multiple heliostats 802, for example, 440 in number, each heliostat 802 7 m×7 m on a 22 acre layout, and concentrates the light onto a receiver 804, for example, a blackened, thin-shelled cylindrical or conical device mounted at the top of a tower 806, for example, tower 806 being 45 m tall. The height and diameter of receiver 804 may be 2 m, and the total incident-light power is 12-14 MW. A storage tank 808 is mounted on or below grade with Brayton turbine 810 connected as described earlier.

Figure 9:
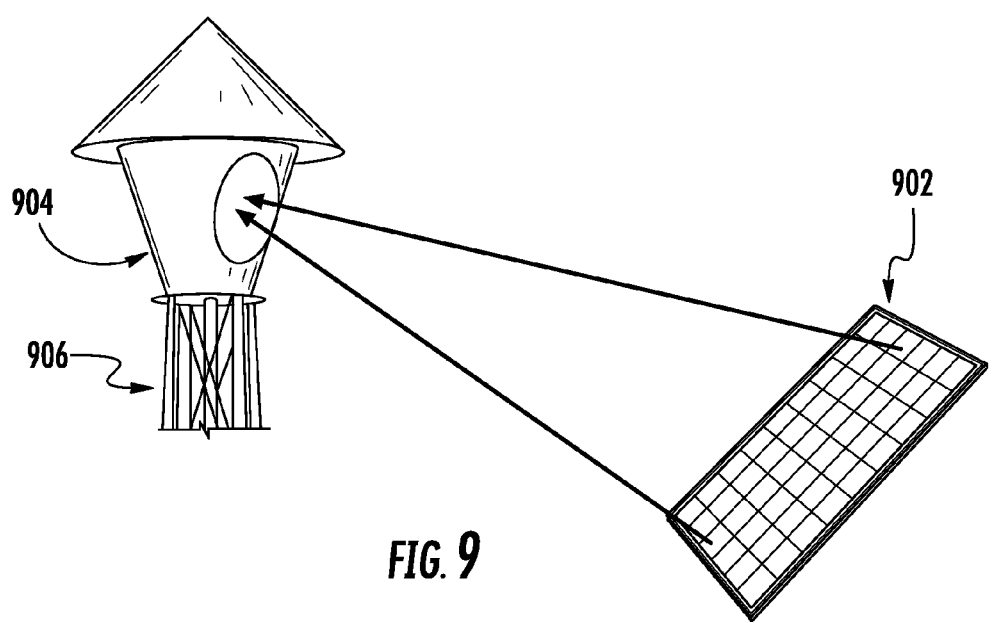
FIG. 9 illustrates the concentration of solar intensity to heat a small receiver.

FIG. 9 illustrates the concentration of solar intensity to heat a small receiver using heliostats readily adapted from currently available designs. In this embodiment, heliostat 902 reflects light to receiver 904 mounted on top of tower 906 in an area within the 2 m×2 m intercepted by the receiver. This small optical footprint is achieved using heliostats 902 having target-aligned mounting and elliptical mirror placement that greatly reduces aberration.

The interior of receiver 904 is evacuated. Roughly 1-2 MW/m$^2$ light flux is absorbed on receiver 904 surface, approximately less than 10% is reradiated, and the remainder conducts through the thin-walled shell that is sprayed-cooled on the inner surface with liquid Na. The high power level immediately vaporizes the Na spray, and receiver 904 becomes the "hot zone" of the vapor transport system. Receiver 904 is mounted on a tower 906.

Re-radiation can be maintained at less than 10% level both by designing the receiver to be small and by assuring that the receiver outer surface temperature does not exceed 1400° K. Power transfer is accomplished by the vapor-transfer method described earlier. The high receiver temperature vaporizes the sodium transfer fluid and the increase in pressure naturally forces its flow to the storage tank.

Figure 10:
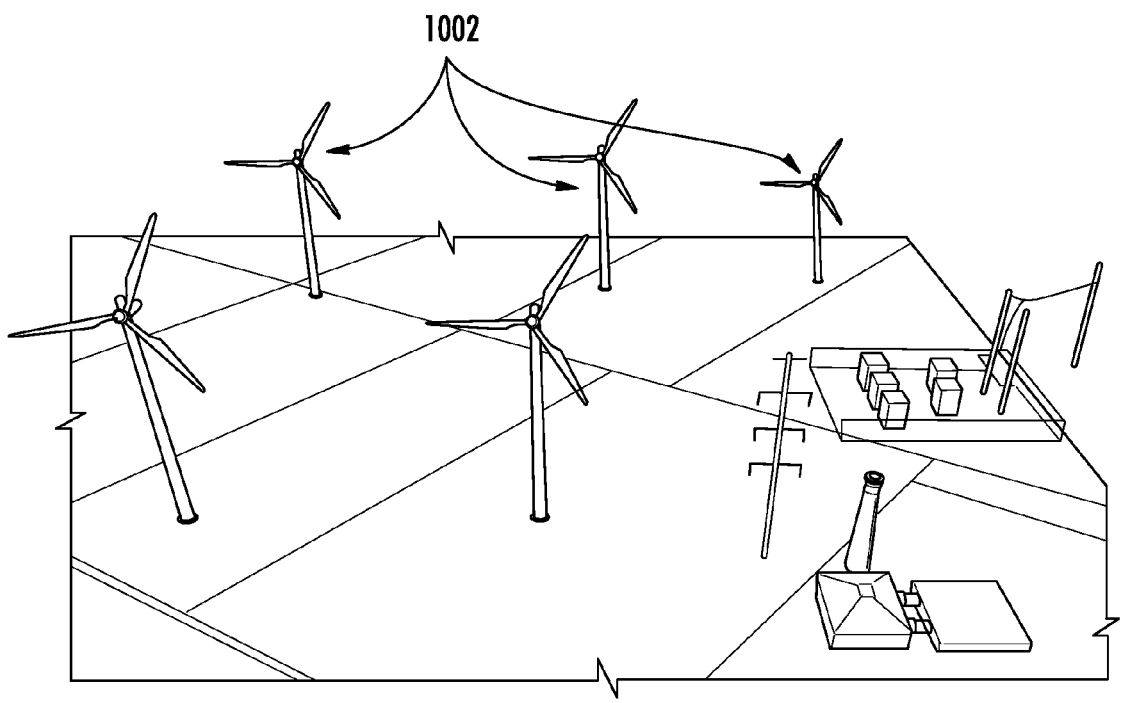
FIG. 10 illustrates another embodiment of the thermal heat storage system using wind energy as the primary source of power.

In another embodiment, FIG. 10 illustrates the thermal heat storage system using wind energy as the primary source of power. The input system coupled to an inlet of the heat injection system provides energy from wind power. A wind farm 1002 may be comprised of a varying number of windmills, depending on their size and local wind conditions. The wind-farm total power and storage needed will determine the number and capacity of individual storage-turbine modules, drawing on the 120 MW(t)-h/day needed to heat the storage tank for 50 MW(e)-h/day generation.

In this embodiment, the heat input does not arise from a high temperature source; the output from the windmills is electrical with a mix of voltages, phases, etc. Therefore, the storage tank may be heated resistively using internal electrodes placed near the bottom of the storage tank. In one mode of operation, excess power produced during periods of low demand would be diverted to heating the storage tank and available when demand increases. In another mode of operation, all of the wind-generated power passes through the thermal heat storage system. Typically, wind farms are equipped with power conditioning equipment that deals with power quality issues, including the variations in voltage, frequency and phase caused by changes in wind conditions. By passing all of the power produced through the thermal heat storage system and generating electricity from the thermal energy stored therefrom, power-conditioning equipment can be reduced or eliminated.

The thermal heat storage system enables distributable power on demand. This allows for nighttime operation and/or load-following operations. Also, because the storage tank has a temperature within that is maintained above 750° C., for example, 800° C., enabling Brayton-cycle electricity generation, the generation efficiency is increased from about 33% for steam turbines to approximately 44% for gas turbines. The open, single pass airstream reduces/eliminates the need for water cooling, which may be an important factor in areas with low water availability.

The thermal heat storage system has a smaller number of system parts than the typical state of art because of the elimination of a second tank, pumps and piping. This reduces the system equipment requirements and is associated with lower costs in the areas of capital, maintenance and operation. Also, this system utilizes a modular design having flexibility in sizing, placement, scheduling, and the like, which meets a wide variety of client and/or market needs. In other embodiments, more than one storage tank may be used in conjunction with other storage tanks. The input-extraction technique may be scaled with the storage tank floor area such as for multiple-tens of MW$_t$-hrs or more.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the invention. Thus, it is intended that the present subject matter covers such modifications and variations.

The invention claimed is:
1. A thermal heat storage and transfer system, comprising:
  a heat storage system, comprising
    a storage tank, comprising
      a subfloor;
      a wall extending from a perimeter edge of the subfloor;
      an endwall;

a closed volume bounded by the subfloor, the wall and the endwall;
a thermal storage material in the closed volume; and
a heat transfer fluid in the closed volume;
a heat injection system comprising:
a receiver;
a chamber below the storage tank and fluidically separated from the storage tank by the subfloor;
a down-tube extending from the receiver through the endwall, the closed volume of the storage tank and the subfloor to the chamber;
a working fluid in the down-tube, the receiver in fluid communication with the chamber via the down-tube; and
a return line extending from the chamber to the receiver external to the storage tank;
a pump to return working fluid condensate from the chamber through the return line to the receiver for circulation through the down-tube to the chamber; and
a heat recovery system coupled to the storage tank;
wherein a flow direction of the working fluid in the down-tube is a one-way flow direction from the endwall to the chamber, the one-way flow direction being parallel to the wall of the storage tank, such that the working fluid flows through the down-tube from the receiver in a single direction to the chamber and exits the chamber to the return line directly from the chamber.

2. The system of claim 1, wherein the thermal storage material includes a salt.

3. The system of claim 2, wherein the salt includes portions of both molten and solid salt, said molten salt and said solid salt naturally separate without pumping.

4. The system of claim 2, wherein the salt is sodium chloride (NaCl) and the heat transfer fluid is Sodium (Na).

5. The system of claim 2, wherein the salt is potassium chloride (KCl) and the heat transfer fluid is Potassium (K).

6. The system of claim 1, the closed volume of the storage tank having an operating temperature of 800° C.

7. The system of claim 1, wherein a temperature deviation of the closed volume is less than 80° C.

8. The system of claim 1, wherein the heat recovery system is comprised of a heat exchanger.

9. The system of claim 1, wherein the heat transfer fluid floats on the thermal storage material under de-pressurized conditions.

10. The system of claim 1, wherein the thermal storage material in solid form has a density greater than the thermal storage material in liquid form.

11. The thermal storage system of claim 1, wherein the receiver is coupled to a primary heat source.

12. The system of claim 11, wherein the primary heat source is a wind-generated electric power source.

13. The system of claim 11, wherein the primary heat source is solar energy.

14. The system of claim 1, wherein the working fluid is an alkali metal transfer fluid in vapor form.

15. The system of claim 14, wherein the alkali metal transfer fluid is Sodium (Na).

16. The system of claim 14, wherein the alkali metal transfer fluid is Potassium (K).

17. The system of claim 1, wherein the closed volume has only one tube passing therethrough, wherein the one tube is the down-tube.

* * * * *